(12) United States Patent
Craft et al.

(10) Patent No.: US 8,341,733 B2
(45) Date of Patent: Dec. 25, 2012

(54) CREATING SECURED FILE VIEWS IN A SOFTWARE PARTITION

(75) Inventors: David Jones Craft, Austin, TX (US); Eric Philip Fried, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1141 days.

(21) Appl. No.: 11/765,824

(22) Filed: Jun. 20, 2007

(65) Prior Publication Data

US 2008/0320590 A1 Dec. 25, 2008

(51) Int. Cl.
G06F 7/04 (2006.01)

(52) U.S. Cl. ........... 726/21; 726/1; 726/17; 713/161; 713/165; 713/166; 713/167; 713/168; 380/259; 455/450

(58) Field of Classification Search ............. 726/17–21; 713/161–168; 455/450
See application file for complete search history.

(56) References Cited

U.S. PATENT DOCUMENTS

| | | | | |
|---|---|---|---|---|
| 5,991,877 | A * | 11/1999 | Luckenbaugh | 726/1 |
| 7,089,588 | B2 * | 8/2006 | Schaefer et al. | 726/22 |
| 7,236,597 | B2 * | 6/2007 | Elliott et al. | 380/263 |
| 7,474,618 | B2 * | 1/2009 | Beckwith et al. | 370/232 |
| 7,509,639 | B2 * | 3/2009 | Worley, Jr. | 718/1 |
| 7,562,232 | B2 * | 7/2009 | Zuili et al. | 713/194 |
| 7,610,618 | B2 * | 10/2009 | Patrick | 726/7 |
| 7,653,699 | B1 * | 1/2010 | Colgrove et al. | 709/213 |
| 7,797,674 | B1 * | 9/2010 | Brewton et al. | 717/105 |
| 7,962,470 | B2 * | 6/2011 | Degenkolb et al. | 707/709 |
| 2002/0087883 | A1 * | 7/2002 | Wohlgemuth et al. | 713/201 |
| 2002/0138728 | A1 * | 9/2002 | Parfenov et al. | 713/170 |
| 2004/0120528 | A1 * | 6/2004 | Elliott et al. | 380/278 |
| 2006/0101263 | A1 * | 5/2006 | Costea et al. | 713/164 |
| 2006/0259785 | A1 * | 11/2006 | Thibadeau | 713/193 |
| 2007/0005555 | A1 * | 1/2007 | Jain et al. | 707/1 |
| 2007/0038681 | A1 * | 2/2007 | Pierce et al. | 707/201 |
| 2007/0112772 | A1 * | 5/2007 | Morgan et al. | 707/9 |
| 2008/0010233 | A1 * | 1/2008 | Sack et al. | 707/1 |
| 2008/0010450 | A1 * | 1/2008 | Holtzman et al. | 713/157 |
| 2008/0016386 | A1 * | 1/2008 | Dror et al. | 714/4 |

OTHER PUBLICATIONS

Jake Wires, Secure File System Versioning at the block level, Jun. 2007, ACM Eurosys 07, vol. 41, pp. 206-212.*
U.S. Appl. No. 11/564,316, filed Nov. 29, 2006, Craft et al.

* cited by examiner

*Primary Examiner* — Nathan Flynn
*Assistant Examiner* — Viral Lakhia
(74) *Attorney, Agent, or Firm* — Yee & Associates, P.C.; Steven L. Bennett

(57) ABSTRACT

A computer implemented method, apparatus, and computer program product for creating secured file views of a protected file. The process receives a request to access the file, wherein the file is stored in a common location, and wherein the request includes a set of file viewing parameters. The process identifies a callback function associated with the file and calls the callback function with the set of file viewing parameters to form a set of virtual viewing parameters. Thereafter, the process generates a secured file view of the file using the virtual viewing parameters, wherein the secured file view is viewable by a user of an authorized partition.

20 Claims, 4 Drawing Sheets

| FILE OFFSET FIELD 402 | VIRTUAL OFFSET FIELD 404 | OFFSET MAP 400 |
|---|---|---|
| 0 | 0 | 406 |
| 100 | 200 | 408 |
| 300 | 550 | 410 |
| 600 | – | 412 |

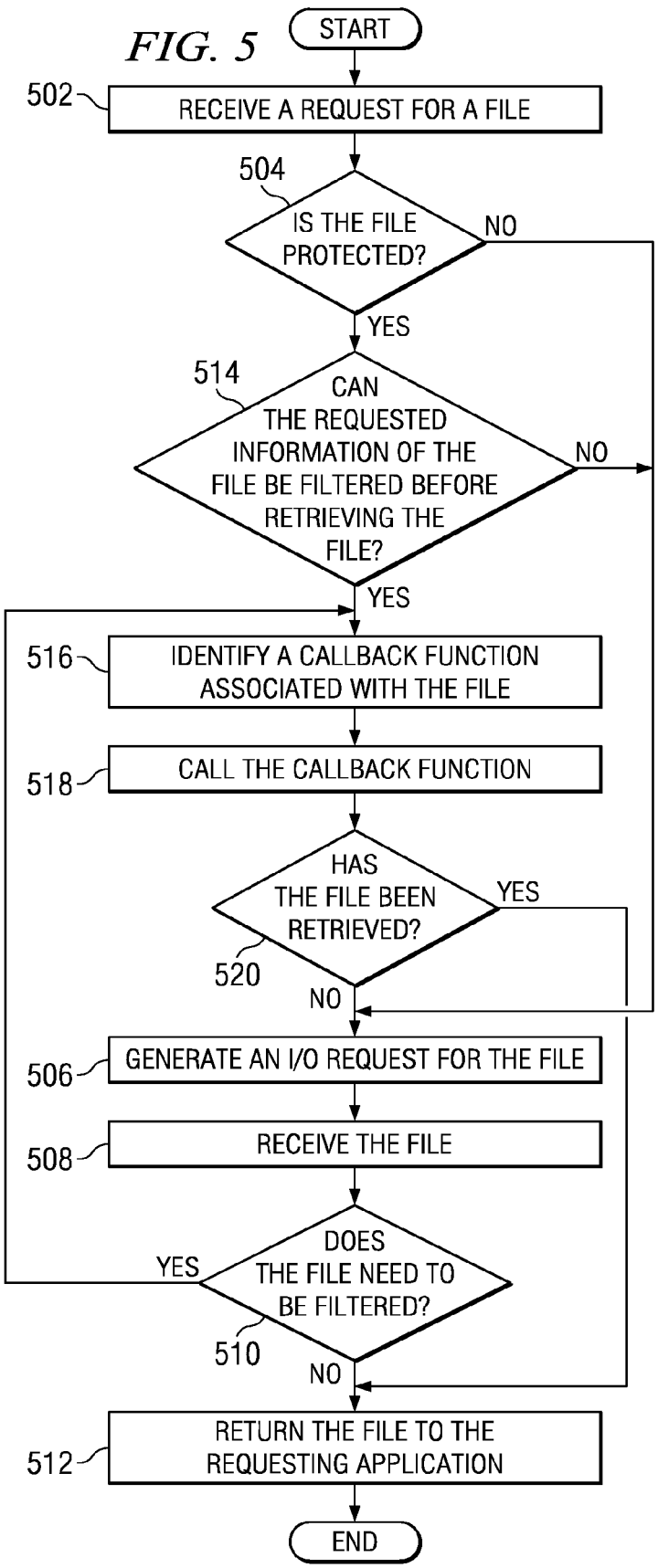

CREATING SECURED FILE VIEWS IN A SOFTWARE PARTITION

BACKGROUND OF THE INVENTION

1. Field of the Invention

The present invention relates generally to an improved data processing system, and in particular to a computer implemented method and apparatus for managing protected data. Still more particularly, the present invention relates to a computer implemented method, apparatus, and computer usable program product for creating secured file views of a protected file in a partitioned computing device to control access to a protected file.

2. Description of the Related Art

Partitions are divisions of a computer system's resources into multiple sets of resources. The sets of resources may include, for example, processors, memory, input/output devices, and storage. In addition, each partition may run a separate instance of an operating system for independently controlling a set of the computer system's resources. Thus, a single computer system may be partitioned into a number of separate computing environments. Each of these environments may be dedicated for different uses. For example, partitions may be used for combining multiple test, development, quality assurance, and production work environments on the same computing system.

The use of partitions in a computer system yields a number of advantages. Some advantages include, for example, reduced cost, ease of maintenance, and ease of accessing certain computer files by the various partitions of the computer system. The ease at which certain computer files may be accessed is attributable to the fact that the computer files of a partitioned computer system are stored in central locations, such as the computer system's hard disk drive. Further, the computer files within the hard disk drive may be accessed by the various partitions by implementing simple mechanisms, such as name fs file mounting or sharing read-only memory segments.

However, certain types of protected data, such as the collection of files in an AIX® Object Data Manager (ODM), may not be easily accessible by the various managed partitions of a computer system. AIX, a UNIX-based operating system, is a registered trademark of International Business Machines, Inc. The AIX ODM is a data manager used for managing a computer system's device configuration information and other system resource information.

A user of a computer system's administrative partition may have the authorization to view and modify the content of a protected file. A protected file is a file containing restricted information. The restricted information is information designated as inaccessible to a user. Restricted information may include, for example, user account information, software/hardware configuration data, financial data, or any other type of data having personal or confidential nature. The protected file may also have unrestricted information that may be presented to one or more users.

A user of a managed software partition, however, may lack the necessary authorization to access the protected file. The user of the managed software partition may be denied access to a protected file for any number of reasons. For example, a managed partition may lack authorization to access a file particular to a different partition, or because system security settings prevent access by the managed partition.

One currently implemented method for giving a user of a managed partition access to a protected file involves providing the managed partition with a copy of the file. However, this method of sharing the protected file often results in the creation of multiple copies of the protected file. The necessity of creating multiple copies of computer files consumes system resources and may lead to the existence of file copies containing different information.

Another currently used method for sharing protected data between partitions of a computer system is providing all managed partitions of a computer system full access to the protected data of the computer system. However, this method of sharing protected data may enable an inexperienced or malicious user to modify a critical system file, thereby crashing the computer system. In addition, full access to the protected files of a computer system may result in the dissemination of sensitive and personal information of the various users.

In yet another currently used method for sharing protected data between partitions of a computer system, users of the various partitions are provided read-only access to the protected files. This solution, however, may allow users to reverse engineer access passwords and gain full access to the protected files.

SUMMARY OF THE INVENTION

The illustrative embodiments described herein provide a computer implemented method, apparatus, and computer program product for creating secured file views of a protected file. The process receives a request to access the file, wherein the file is stored in a common location, and wherein the request includes a set of file viewing parameters. The process identifies a callback function associated with the file and calls the callback function with the set of file viewing parameters to form a set of virtual viewing parameters. Thereafter, the process generates a secured file view of the file using the virtual viewing parameters, wherein the secured file view is viewable by a user of an authorized partition.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 5 is a flowchart of a process for filtering restricted information from a protected file in accordance with an illustrative embodiment.

DETAILED DESCRIPTION OF THE PREFERRED EMBODIMENT

Figure 1:
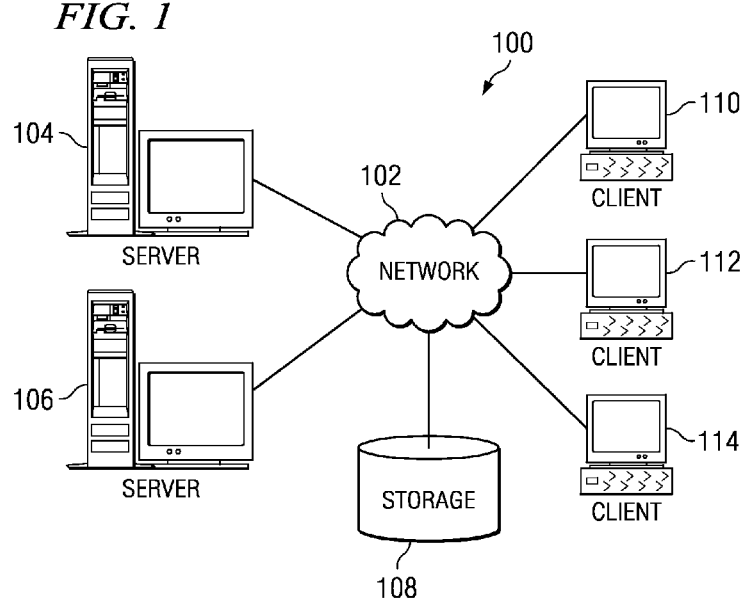
FIG. 1 is a pictorial representation of a network data processing system in which illustrative embodiments may be implemented.
Figure 2:
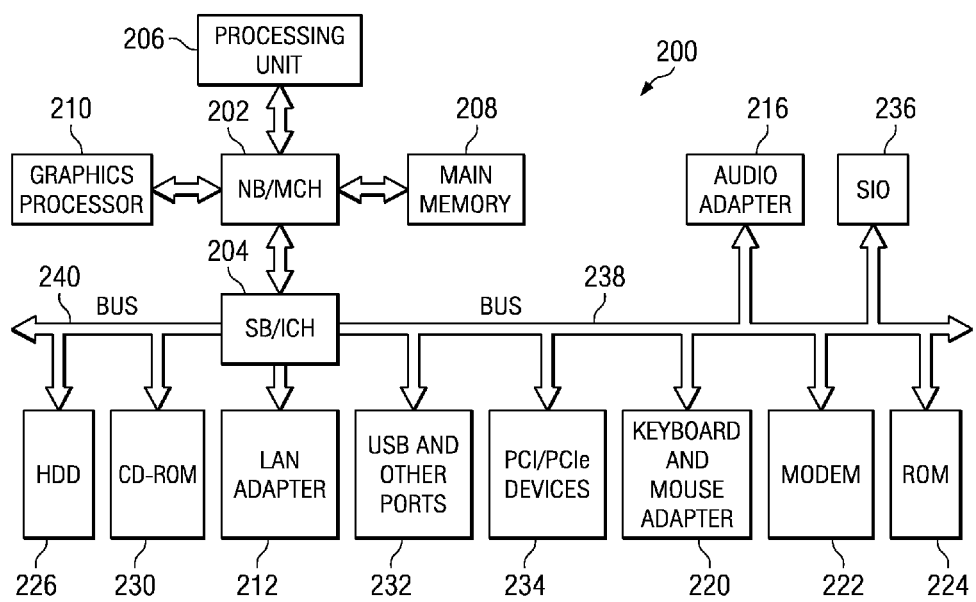
FIG. 2 is a block diagram of a data processing system in which the illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

With reference now to FIG. 2, a block diagram of a data processing system is shown in which illustrative embodiments may be implemented. Data processing system 200 is an example of a computer, such as server 104 or client 110 in FIG. 1, in which computer usable program code or instructions implementing the processes may be located for the illustrative embodiments.

In the depicted example, data processing system 200 employs a hub architecture including a north bridge and memory controller hub (NB/MCH) 202 and a south bridge and input/output (I/O) controller hub (SB/ICH) 204. Processing unit 206, main memory 208, and graphics processor 210 are coupled to north bridge and memory controller hub 202. Processing unit 206 may contain one or more processors and even may be implemented using one or more heterogeneous processor systems. Graphics processor 210 may be coupled to the NB/MCH through an accelerated graphics port (AGP), for example.

In the depicted example, local area network (LAN) adapter 212 is coupled to south bridge and I/O controller hub 204 and audio adapter 216, keyboard and mouse adapter 220, modem 222, read only memory (ROM) 224, universal serial bus (USB) and other ports 232, and PCI/PCIe devices 234 are coupled to south bridge and I/O controller hub 204 through bus 238, and hard disk drive (HDD) 226 and CD-ROM 230 are coupled to south bridge and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE) or serial advanced technology attachment (SATA) interface. A super I/O (SIO) device 236 may be coupled to south bridge and I/O controller hub 204.

An operating system runs on processing unit 206 and coordinates and provides control of various components within data processing system 200 in FIG. 2. The operating system may be a commercially available operating system such as Microsoft® Windows® XP (Microsoft and Windows are trademarks of Microsoft Corporation in the United States, other countries, or both). An object oriented programming system, such as the Java™ programming system, may run in conjunction with the operating system and provides calls to the operating system from Java™ programs or applications executing on data processing system 200. Java™ and all Java™-based trademarks are trademarks of Sun Microsystems, Inc. in the United States, other countries, or both.

Instructions for the operating system, the object-oriented programming system, and applications or programs are located on storage devices, such as hard disk drive 226, and may be loaded into main memory 208 for execution by processing unit 206. The processes of the illustrative embodiments may be performed by processing unit 206 using computer implemented instructions, which may be located in a memory such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may be comprised of one or more buses, such as a system bus, an I/O bus and a PCI bus. Of course the bus system may be implemented using any type of communications fabric or architecture that provides for a transfer of data between different components or devices attached to the fabric or architecture. A communications unit may include one or more devices used to transmit and receive data, such as a modem or a network adapter. A memory may be, for example, main memory 208 or a cache such as found in north bridge and memory controller hub 202. A processing unit may include one or more processors or CPUs. The depicted examples in FIGS. 1-2 and above-described examples are not meant to imply architectural limitations. For example, data processing system 200 also may be a tablet computer, laptop computer, or telephone device in addition to taking the form of a PDA.

The illustrative embodiments described herein provide a computer implemented method, apparatus, and computer program product for creating secured file views of a protected file. The process receives a request to access the file, wherein the file is stored in a common location, and wherein the request includes a set of file viewing parameters. The process identifies a callback function associated with the file and calls the callback function with the set of file viewing parameters to form a set of virtual viewing parameters. Thereafter, the process generates a secured file view of the file using the virtual viewing parameters. A secured file view is a file generated from the unrestricted information within a protected file, and is only viewable by a user of an authorized partition.

The set of virtual viewing parameters is one or more parameters usable to generate a secure file view. In particular, the set of virtual viewing parameters may be used to control a user's access to a protected file. Alternatively, the set of virtual viewing parameters may be used to identify the unrestricted information within a protected file after the protected file has been accessed by the user.

In limiting a user's access to a protected file, the set of virtual viewing parameters may be parameters usable by a system call for limiting a user's ability to access portions of a protected file. In this embodiment, the process identifies an inode associated with the requested file. The process then calls a callback function identified by the inode. A callback function is an executable code module that, in this example, converts a set of file viewing parameters to a set of virtual viewing parameters. A set of file viewing parameters is one or more variables for identifying a file, or a portion of a file, for access by a user. As an example, the set of file viewing parameters may specify the name of a protected file and the portions of the file requested by a user.

In an illustrative embodiment, a callback function converts the set of file viewing parameters to a set of virtual viewing parameters by implementing an offset map. In this embodiment, the offset map is a one-to-one translation table for mapping a file viewing parameter to a virtual viewing parameter. Using file viewing parameters to retrieve portions of a protected file may result in the return of restricted information. However, the use of virtual viewing parameters allows a user to receive only the unrestricted information within the protected file. Consequently, the restricted information of a protected file may be filtered out. The remaining unrestricted information may then be used to generate a secured file view.

The set of virtual viewing parameters may be used by a system call to retrieve a file. The set of file viewing parameters may be, for example, file offset values. An offset value is an indicator usable to identify portions of data stored in a protected file. For an unprotected file, the file offset values may be used to retrieve the entire requested file, or a portion of a requested file, corresponding to the file offset values. The actual file returned, however, corresponds to the set of virtual viewing parameters rather than the set of file offset values. In this example, the set of virtual viewing parameters is the set of virtual offset values.

In another embodiment, the set of virtual viewing parameters may be used to identify restricted information from a protected file after the file has been accessed. For example, the set of virtual viewing parameters may be identifiers contained within a file for identifying unrestricted information. The virtual viewing parameters may include, for example, a variable, a string of text, or other identifier encoded into a protected file. Once the protected file has been accessed, a callback function may filter the restricted information from the protected file by referencing the virtual viewing parameters.

Figure 3:
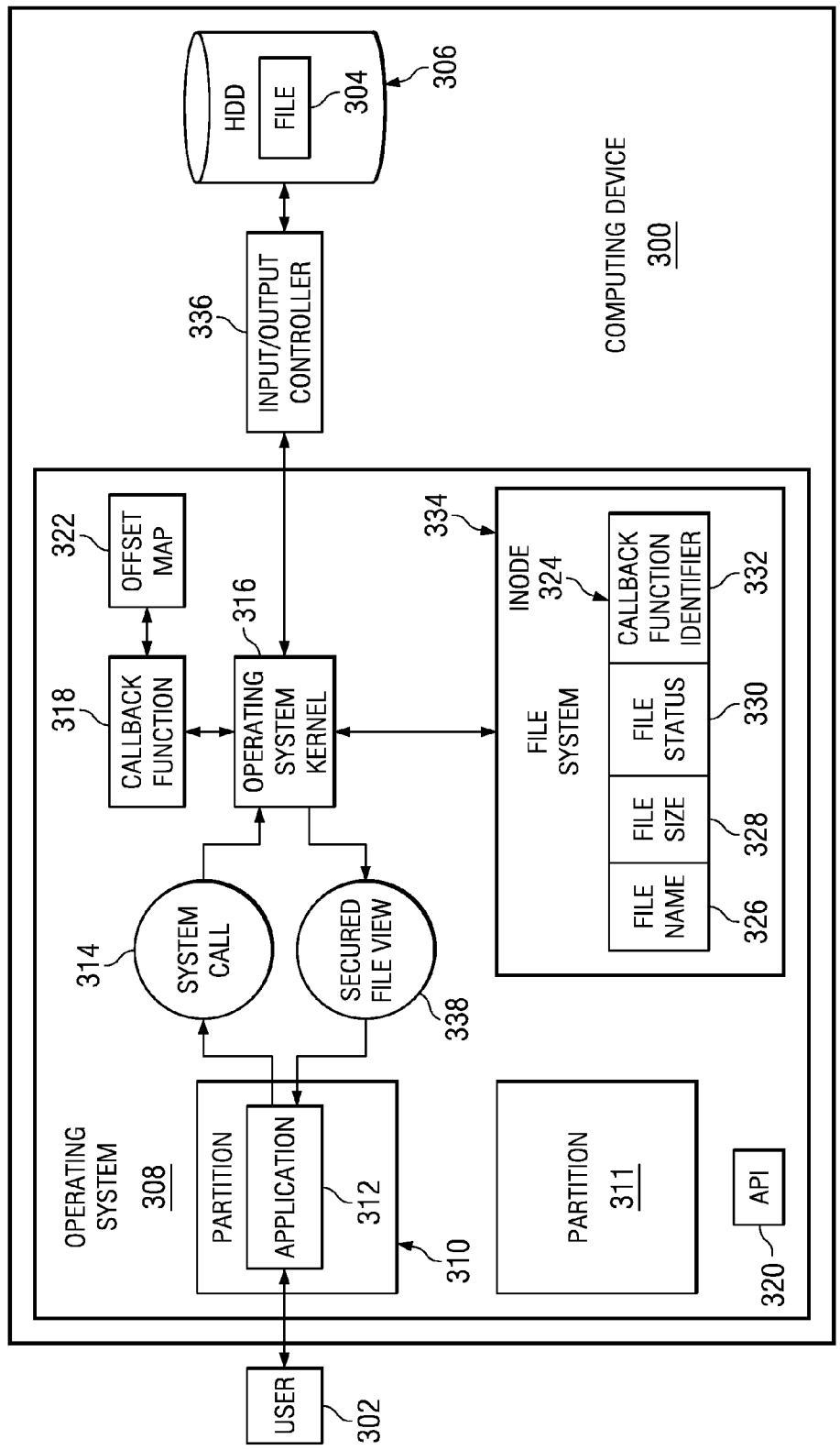
FIG. 3 is a diagram of components for use in controlling access to a file having a protected status in accordance with an illustrative embodiment.

Turning now to FIG. 3, a diagram of components of a computing device for use in controlling access to the protected file is depicted in accordance with an illustrative embodiment. Computing device 300 is a computing device, such as server 102 and client 110 in FIG. 1.

Computing device 300 is operable by user 302 to access file 304. File 304 is a protected file stored in HDD 306. HDD 306 is a storage device, such as HDD 226 in FIG. 2. Although HDD 306 is depicted as a component of computing device 300, in other embodiments, HDD 306 may be a network storage device, such as storage 108 in FIG. 1.

Computing device 300 is executing operating system 308, which includes partitions 310 and 311. Partitions 310 and 311 are managed partitions of computing device 300. In this example, partitions 310 and 311 have authorization to view computer files stored in a common location, such as file 304 stored in HDD 306. A common location is a component or device for storing information and data that is accessible by the various partitions of a computing device. Thus, because both partitions 310 and 311 have access to the files stored within HDD 306, HDD 306 is a common location. In other embodiments, a common location may be, for example, a shared memory location, a removable storage device, a networked storage device, or any other device capable of storing information accessible by the partitions of computing device 300.

However, partitions 310 and 311 have varying levels of authorization so that each partition has the ability to view different portions of file 306. For example, file 306 may be a file storing account information for the various users of computing device 300. If partitions 310 and 311 are each assigned to individual users, then each partition would have authorization to view only those portions of file 306 corresponding to the account information of the user of the partition.

Although in this example, operating system 308 is the AIX operating system offered by IBM, in alternate embodiments, operating system 308 may be an operating system including, without limitation, Solaris®, HP-UX®, Linux®, and VMWare®. Solaris is a registered trademark of Sun Microsystems, Inc. HP-UX is a registered trademark of Hewlett-Packard Co. Linux is a registered trademark of Linus Torvalds. VMWare is a registered trademark of VMWare, Inc.

To access file 304 from partition 310, user 302 causes application 312 to generate a request for file 304. Application 312 is a software application such as, for example, a text editor, an account manager, a device manager, or any other application capable of execution in computing device 300. In this illustrative example, application 312 is executing in partition 310. However, in alternate embodiments, application 312 may be executing in the administrative partition of computing device 300.

In this example, the request generated by application 312 is system call 314. System call 314 is a system call for requesting service from operating system 308. System call 314 may be, for example, an open( ), a read( ), a seek( ), or a tell( ) system call for accessing file 304. In the illustrative example in FIG. 3, system call 314 requests operating system kernel 316 to retrieve file 304.

System call 314 includes a set of file viewing parameters usable by operating system kernel to identify the user-requested file. In this example, the user-requested file is file 304. In addition, the set of file viewing parameters may indicate that user 302 requests access to file 304 in its entirety, or that user 302 requests access to only a portion of file 304. In one embodiment, the set of file viewing parameters includes a set of file offset values. The set of file offset values correspond to information of file 304.

For example, to illustrate the use of a file offset value for requesting data from a file, consider a read( ) system call. A simplified read( ) system call generally takes the following form: read(filehandle, buffername, nbyte). Filehandle is a reference to the internal control structure of an open file. Buffername is a reference to the buffer into which data is read, and nbyte is a number of bytes that the read( ) system call will read into buffername. Thus, the above-referenced read( ) system call reads nbyte number of bytes from the file represented by filehandle into buffername. More specifically, the read( ) system call starts reading a portion of a file at a specified starting location and continues reading until the specified number of bytes has been read. After each byte is read, a file offset value is incremented. Thus, by providing a starting location within a file and a specific file offset value, a user can generate a request for specific portions of a file.

If the set of file viewing parameters is used to retrieve file 304, then user 302 may receive restricted information contained within file 304. Thus, the set of file viewing parameters is converted to a set of virtual viewing parameters. Virtual viewing parameters are parameters that identify the unrestricted information within file 304. The virtual viewing parameters are usable to filter the restricted information from file 304.

In this example, the callback function 318 converts the set of file viewing parameters defined in system call 314 to a set of virtual viewing parameters. Callback function 318 is an executable code module that implements API 320. API 320 is an application programming interface created by an operating system developer that defines the functionality of callback function 318. For example, API 320 may specify that callback function 318 should convert a set of file viewing parameters to a set of virtual viewing parameters. In particular, API 320 may specify the format of the file viewing parameters receivable by callback function 318 and the manner in which callback function 318 returns virtual offset values.

In one embodiment, API 320 dictates that callback function 318 converts a set of file viewing parameters received in system call 314 to a set of virtual viewing parameters. In this example, callback function 318 implements this conversion by utilizing offset map 322. In this example, offset map 322 is a translation table mapping file viewing parameters to virtual viewing parameters. Although in this example, offset map 322 is a table, in other embodiments, offset map 322 may be a database, registry, or other similar structure capable of facilitating or enabling the conversion of file offset values to virtual offset values. More detail of this mapping is provided in FIG. 4 below.

Depending upon the particular implementation, callback function 318 may filter the restricted information of file 304 either before file 304 is retrieved from HDD 306 or after file 304 has been retrieved. For example, callback function 318 may determine that offset map 322 contains an identification system that would permit callback function 318 to identify the unrestricted information of file 304 before retrieval from HDD 306. In this example, offset map 322 may contain a list identifying the restricted information and unrestricted information. Consequently, once callback function receives system call 314 containing a set of file viewing parameters, callback function may use offset map 322 to filter out from file 304 the restricted information. A more detailed description of offset map 322 is provided in FIG. 4.

In an alternate embodiment, callback function 318 may implement another method or algorithm for identifying and filtering restricted information from file 304. For example, the restricted information within file 304 may be identified in file 304 by a designated pattern of binary values, a variable, a string of text, or other identifier encoded into a protected file. The identifiers may be defined in offset map 322 and may function as tags to identify restricted information from unrestricted information. In this embodiment, callback function 318 may filter the restricted information from file 304 after file 304 has been retrieved from HDD 306.

Operating system kernel 316 receives system call 314. In response, operating system kernel 316 identifies the callback function associated with the requested file. In this example, callback function 318 is associated with file 304, the requested file. Furthermore, in this example, operating system kernel 316 identifies callback function 318 by referencing an inode structure associated with file 304. In this example, inode 324 is the inode associated with file 304.

Inode 324 is one or more data structures that store basic information about file system objects, such as file 304. The basic information stored in inode 324 may include fields commonly found in inodes of existing computing systems. Inode 324 may include, for example, file name 326 and file size 328. File name 326 is a field of inode 324 that specifies the name of its associated file. File size 328 is a field of inode 324 that indicates the size of file 304.

In this illustrative example in FIG. 3, inode 324 is modified to include file status 330 and callback function identifier 332. File status 330 is a field of inode 324 for indicating whether the associated file, file 304, has a protected status. A protected status is a designation of a file indicating that the file contains restricted information. The protected status of file 304 may be designated by any method, including, for example, a string of text, a flag, a character, or symbol. For example, the protected status of file 304 may be indicated by the word "protected." In addition, the existence of a flag in file status 330 may designate a protected status of file 304.

File status 330 may also include relevant policy-based information for controlling access to a common file. For example, file status 330 may also include information specifying the identity of those partitions of computing device 300 having authorization to access file 304. File status 330 may specify a policy indicating that a user of partition 310 may access file 306, but not a user of partition 311. Thus, a user of an unauthorized partition will be denied access to file 304 if a rule within file status 330 prevents retrieval of the requested file by a requesting partition.

Callback function identifier 332 is a field of inode 324 that stores information for identifying the callback function associated with the requested file. In this example, callback function identifier 332 identifies callback function 318 that is associated with file 304. Callback function identifier 332 may identify the callback function associated with the requested file by storing a name of the callback function, a memory location of the callback function, or any other identifier.

Inode 324 is stored in file system 334. File system 334 is a system for the storage, hierarchical organization, manipulation, navigation, access, and retrieval of computer files and data.

Once callback function 318 returns the set of virtual offset values, operating system kernel 316 generates an input/output request for the file using the virtual offset values. The input/output request is passed to input/output controller 336. Input/output controller 336 retrieves from HDD 306 the requested portions of file 304 corresponding to the set of virtual viewing parameters. Input/output controller 336 is a device driver for providing an interface between operating system kernel 316 and HDD 306. In this example, input/output controller 336 receives an input/output request from operating system kernel 316 retrieving files stored in HDD 306.

After operating system kernel 316 receives from input/output controller 336 the requested information, operating system kernel 316 provides the requested information to application 312 in the form of secured file view 338. Secured file view 338 is a file generated from the unrestricted information of file 304 requested by user 302. Application 312 presents secured file view 338 to user 302.

Thus, as described above, user 302 operating computing device 300 may request access to file 304, a protected file. Restricted information of file 304 is filtered out from file 304 to create secured file view 338. In this embodiment, callback function 318 performs the requisite filtering of file 304. Thereafter, secured file view 338 is presented to user 302. Secured file view 338 is generated from information stored in file 304, a protected file stored in a shared location that is accessible by all partitions within computing device 300. Further, secured file view 338 is only viewable by a user of an authorized partition. In FIG. 3, user 302 utilizing partition 310 receives secured file view 338. Another user, operating partition 311 is incapable of viewing secured file view 338. In contrast, a user of partition 311 would receive a different secured file view that may contain different information.

In this illustrative example in FIG. 3, a single inode, inode 324, was associated with a single callback function, callback function 318 to simply illustrate the interaction of the components of computing device 300. However, in alternate embodiments, file system 334 may contain multiple inodes. Further, more than one inode may identify the same callback function. In addition, callback function 318 may also be a library of callback functions storing multiple callback functions.

Although in this illustrative example callback function 318 is an executable code module residing in an administrative partition, callback function 318 may be stored in a managed partition, inserted as code within operating system kernel 316, or stored in a local storage device, such as HDD 306. Further, callback function 318 may also be stored in a remote network storage device, such as storage 108 in FIG. 1. Similarly, in other embodiments, offset map 322 may also be stored in a local storage device or a remote network storage device.

Importantly, access to offset map 322 and callback function 318 must be restricted when stored in locations of computing device 300 that may be easily accessed by user 302. For example, security measures should be implemented if offset map 322 and callback function 318 are stored in user space or in HDD 306. Appropriate security measures should be implemented to prevent a user, such as user 302 of partition 310 from discovering that a requested file contains protected information.

Figures 4, 6:
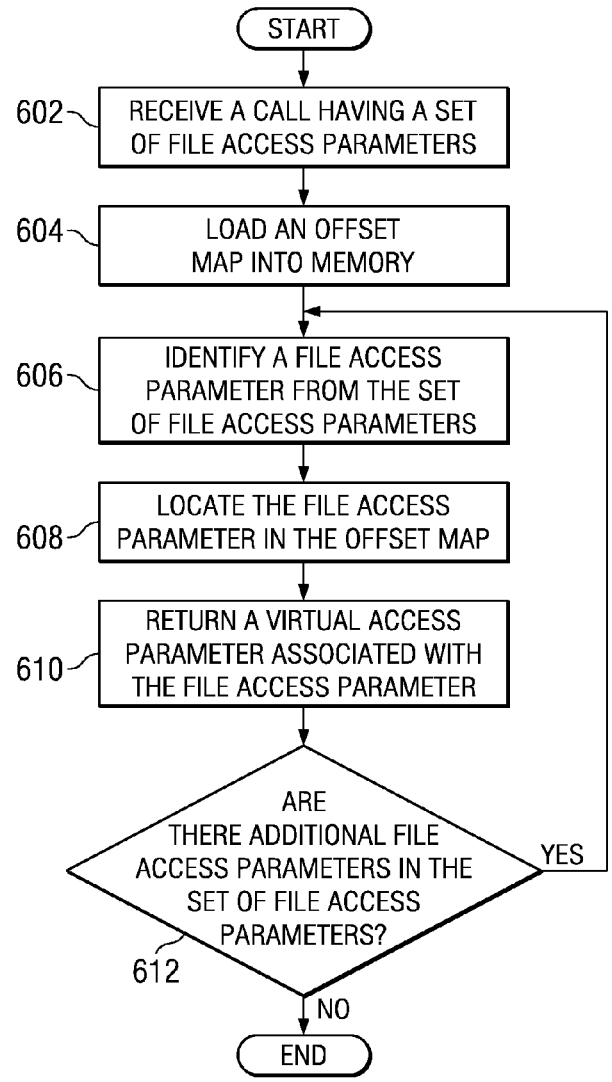
FIG. 4 is an offset map for use in converting a set of file viewing parameters to a set of virtual viewing parameters in accordance with an illustrative embodiment.
FIG. 6 is a flowchart of a process for converting a set of file viewing parameters to a set of virtual viewing parameters in accordance with an illustrative embodiment.

Turning now to FIG. 4, an exemplary offset map for use in forming a set of virtual viewing parameters is depicted in accordance with an illustrative embodiment. Offset map 400 is an offset map, such as offset map 322 in FIG. 3.

Offset map 400 is populated with a set of file viewing parameters and a corresponding set of virtual viewing parameters. In this illustrative example, the set of file viewing parameters is a set of file offset values stored in file offset field 402. Similarly, the set of virtual viewing parameters is a set of virtual offset values corresponding to the set of file offset values. The set of virtual viewing parameters are stored in virtual offset field 404.

File offset field 402 and virtual offset field 404 are fields containing file offset values and virtual offset values, respectively. The set of file offset values contained in file offset field 402 are the offset values corresponding to actual positions within a requested file, such as file 304 in FIG. 3. Because file 304 is a protected file, the set of file offset values necessarily references restricted information. Consequently, satisfying a system call using the file offset values may result in the return of restricted information. Thus, system calls are carried out using virtual offset values.

The virtual offset values stored in virtual offset field 404 are offset values corresponding to positions of the file referencing unrestricted information. Each virtual offset value corresponds to a file offset value. Thus, a system call specifying a file offset value may be replaced with the corresponding virtual offset value. By converting file offset values of a system call to virtual offset values, only unrestricted information will be provided in response to system calls requesting restricted information.

In offset map row 406, the file offset value 0 (zero) corresponds to the virtual offset value 0 (zero). Likewise, in offset map row 408 file offset value 100 corresponds to the virtual offset value 200. In offset map row 410, file offset value 300 corresponds to the virtual offset value 550. Finally, in offset map row 412, file offset value 600 has no corresponding virtual offset value. A file offset value may not have a corresponding virtual offset value if, for example, the protected file has no remaining unrestricted information corresponding to the remaining offset values.

For example, because the set of file offset values in the range of 0-99 correspond to the set of virtual offset values having the same range, then in this example, file offset values 0-99 contain unrestricted information. Consequently, if a callback function receives a system call identifying for retrieval any information within file offset range of 0-99, the callback function would return a virtual offset value corresponding to the requested file offset value.

Turning now to offset map row 408, if the callback function receives a system call requesting access to information within file offset range 100-199, then the callback function will return a corresponding virtual offset value in the range 200-299, as depicted in offset map row 408. For example, if the system call requests access to information represented by file offset value 100-105, then the callback function returns virtual offset values of 200-205. This result may occur because the information identified by file offset values 100-199 is deemed restricted. Likewise, the information identified by virtual offset values 200-299 may be deemed unrestricted. Therefore, by returning one or more virtual offset values corresponding to a file offset value, only unrestricted information will be returned.

In some instances, a system call may specify a set of file offset values that may not have a corresponding virtual offset value. This result may occur when no additional unrestricted information remains in file 304. For example, in offset map row 412, file offset value 600 lacks a corresponding virtual offset value. Consequently, a callback function receiving a file offset value of 600 may return an error. In an illustrative embodiment, the nature of this error would be identical to an error received when an attempt is made to read outside the valid range of a normal file not implementing an offset map for converting file offset values to virtual offset values.

In sum, the file offset value is converted to a virtual offset value by a callback function, such as callback function 318 in FIG. 3. In the depicted embodiment, the callback function requires the use of offset map 400 to complete this conversion. In particular, once a callback function receives a call specifying a set of file offset values, the callback function locates the file offset value in offset map 400 and returns the corresponding virtual offset value. The virtual offset value may then be used to create a secured file view of a requested file.

Turning now to FIG. 5, a flowchart of a process for filtering restricted information from a protected file in accordance with an illustrative embodiment. In this illustrative embodiment of FIG. 5, the process may be performed by a software component, such as operating system kernel 316 in FIG. 3.

The process begins by receiving a request for a file (step 502). The request may be a system call, such as system call 314 in FIG. 3.

Thereafter, the process makes the determination as to whether the file is protected (step 504). In one illustrative embodiment, the process may make the determination that the requested file is protected by referencing an inode associated with the requested file. In particular, the process may reference a field of the inode designating the status requested file. The referenced field may be a file status field, such as file status field 330 in FIG. 3. Of course the determination may be made using other mechanisms depending on the implementation.

If the process makes the determination that the file is not protected, then the process generates an I/O request for the file (step 506). As used herein, retrieval of the file can mean retrieving the entire file, or a requested portion of the file.

The process receives the requested file (step 508) and makes a determination as to whether the received file needs to be filtered (step 510). If the file is an unprotected file, then the file does not need to be filtered. Consequently, the process returns the file to the requesting application (step 512). The process terminates thereafter.

Returning now to step 504, if the process makes the determination that the file is protected, the process makes the subsequent determination as to whether the restricted information of the protected file can be filtered before the file is retrieved (step 514).

If the process makes the determination that the restricted information of the protected file can be filtered before retrieving the file, the process identifies a callback function associated with the file (step 516). The process may identify the callback function associated with the requested file by referencing an inode associated with the requested file. In particular, the process may reference a field of the inode identifying the associated callback function. The referenced field may be a callback function identifier field, such as callback function identifier 332 in FIG. 3.

Thereafter, the process calls the callback function (step 518) and determines whether the requested file has been retrieved (step 520). If the process makes the determination that the requested file has not yet been retrieved, then the process continues to step 506. Here, the requested file was filtered prior to retrieval and as a result, the requested file has not yet been retrieved.

The process generates an I/O request for the file (step 506), receives the file (step 508), and makes the determination as to whether the file needs to be filtered (step 510). Because the file was filtered in step 518 by the callback function, the process makes the determination that the file does not need to be filtered again and proceeds to step 512.

Returning now to step 514, if the process makes the determination that the restricted information of the protected file cannot be filtered prior to retrieving the file, then the process generates an I/O request for the file (step 506), receives the requested file (step 508), and makes the determination as to whether the file needs to be filtered (step 510). Because the file has not yet been filtered, the process makes the determination that the file needs to be filtered. Consequently, the process identifies the callback function associated with the file (step 516), calls the callback function 318, and makes the determination as to whether the file has been retrieved (step 520). Because the file has already been retrieved immediately prior to filtering, the process continues to step 512.

Turning now to FIG. 6, a flowchart of a representative process for converting a set of file viewing parameters to a set of virtual viewing parameters is depicted in accordance with an illustrative embodiment. In this illustrative embodiment in FIG. 5, the process may be performed by a software component such as callback function 318 in FIG. 3.

The process begins by receiving a call having a set of file access parameters (step 602). In one embodiment, the set of file access parameters is a set of file offset values.

The process then loads an offset map into memory (step 604). Thereafter, the process identifies a file access parameter from the set of file access parameters (step 606).

Next, the process locates the file access parameter in the offset map (step 608), and returns a virtual access parameter associated with the file access parameter (step 610). The virtual access parameter may be, for example, a virtual offset value.

Subsequently, the process makes the determination as to whether there are additional file access parameters in the set of file access parameters (step 612). If the process makes the determination that there are no additional file access parameters in the set of file access parameters, the process terminates thereafter. However, if the process makes the determination that there exist additional file access parameters in the set of file access parameters, then the process returns to step 606.

The flowcharts and block diagrams in the different depicted embodiments illustrate the architecture, functionality, and operation of some possible implementations of methods, apparatus, and computer program products. In this regard, each block in the flowchart or block diagrams may represent a module, segment, or portion of code, which comprises one or more executable instructions for implementing the specified function or functions. In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved.

The illustrative embodiments described herein provide a computer implemented method, apparatus, and computer program product for creating secured file views of a protected file. The process receives a request to access the file, wherein the file is stored in a common location, and wherein the request includes a set of file viewing parameters. The process identifies a callback function associated with the file and calls the callback function with the set of file viewing parameters to form a set of virtual viewing parameters. Thereafter, the process generates a secured file view of the file using the virtual viewing parameters, wherein the secured file view is viewable by a user of an authorized partition.

Using the methods and apparatus disclosed herein, a user's access to a protected file from a managed partition may be controlled. This method of access control prevents a user from realizing that any information has been withheld. Consequently, greater security is achieved because the user has no incentive to attempt to investigate the existence of withheld information. However, even if the user wanted to search for restricted information within the protected file, the user would be unable to access that information. For example, a user-generated seek or read system call for restricted data would yield only unrestricted information or an error message.

Furthermore, this solution obviates the need for creating unnecessary copies of a protected file, thereby preserving system resources. Additionally, this solution prevents file drifting that results when multiple versions of a single file are created and modified.

In addition, because the callback functions may be stored in a callback function library, this solution is extensible and allows for an unlimited number of mapping configurations. The different mapping configurations may be based on any number of factors, such as, for example, the identity of the partition from which a file access request is generated, the identity of the user who generated the file access request, or the particular content of the file itself.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories, which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for creating secured file views of a protected file, the computer implemented method comprising:

receiving a request to access the protected file from a user of a software partition, wherein the protected file is stored in a common storage device for a file system, wherein the request includes a set of file viewing parameters that reference restricted portions and unrestricted portions of the protected file;

identifying a set of file offset values in the set of file viewing parameters, wherein the set of file offset values correspond to actual locations within the protected file;

calling a callback function associated with the protected file to map one or more file offset values in the set of file offset values to a virtual offset value in a set of virtual offset values to form a set of virtual viewing parameters, wherein the set of virtual offset values correspond to only unrestricted locations within the protected file referencing only the unrestricted portions of the protected file; and generating a secured file view of the protected file using the virtual viewing parameters by returning data from only locations within the protected file that correspond with a virtual offset value in the set of virtual offset values in the virtual viewing parameters, wherein the secured file view is viewable by the user of the software partition and wherein the secured file view does not include a view of data in the restricted portions of the protected file originally requested in set of file viewing parameters in the request.

2. The computer implemented method of claim 1, wherein the software partition is one of a plurality of software partitions configured to access files stored in the common storage device, wherein each partition in the plurality of software partitions has differing levels of authorization to view information in the protected file, and wherein the callback function generates differing views of information in the protected file for each partition in the plurality of software partitions.

3. The computer implemented method of claim 1, wherein a protected status of the protected file is designated by a first field of an inode and wherein the callback function is identified by a second field of the inode.

4. The computer implemented method of claim 1 further comprising:

identifying the software partition in a set of requesting partitions that the request originated from;

determining whether the software partition the request originated from is authorized to view the protected file based on a policy specified in a file status for the protected file; and responsive to determining that the software partition is authorized to view the protected file, generating different views of information in the protected file for one or more partitions in the set of requesting partitions based on the policy.

5. The computer implemented method of claim 4, wherein calling the callback function using the set of file viewing parameters to form the set of virtual viewing parameters comprises:

replacing the set of file viewing parameters included in the request for the protected file with the set of virtual viewing parameters.

6. The computer implemented method of claim 1, wherein the callback function utilizes an offset map to form the set of virtual viewing parameters.

7. The computer implemented method of claim 1, wherein the request is a system call.

8. A computer program product for creating secured file views of a protected file, the computer program product comprising:

one or more non-transitory computer readable storage mediums;

computer usable program code stored on at least one of the one or more non-transitory computer readable storage mediums for receiving a request to access the protected file from a user of a software partition, wherein the protected file is stored in a common storage device for a file system, wherein the request includes a set of file viewing parameters that reference restricted portions and unrestricted portions of the protected file;

computer usable program code stored on at least one of the one or more non-transitory computer readable storage mediums for identifying a set of file offset values in the set of file viewing parameters, wherein the set of file offset values correspond to actual locations within the protected file;

computer usable program code stored on at least one of the one or more non-transitory computer readable storage mediums for calling a callback function to map one or more file offset values in the set of file offset values to a virtual offset value in a set of virtual offset values to form a set of virtual viewing parameters, wherein the set of virtual offset values correspond to only unrestricted locations within the protected file referencing only the unrestricted portions of the protected file; and computer usable program code stored on at least one of the one or more non-transitory computer readable storage mediums for generating a secured file view of the protected file using the virtual viewing parameters by returning data from only locations within the protected file that correspond with a virtual offset value in the set of virtual offset values in the virtual viewing parameters, wherein the secured file view is viewable by the user of the software partition and wherein the secured file view does not include a view of data in the restricted portions of the protected file originally requested in set of file viewing parameters in the request.

9. The computer program product of claim 8, wherein the software partition is one of a plurality of software partitions configured to access files stored in the common storage device, wherein each partition in the plurality of software partitions has differing levels of authorization to view information in the protected file, and wherein the callback function generates differing views of information in the protected file for each partition in the plurality of software partitions.

10. The computer program product of claim 8, wherein a protected status of the protected file is designated by a first field of an inode, and wherein the callback function is identified by a second field of the inode.

11. The computer program product of claim 8 further comprising:

computer usable program code stored on at least one of the one or more non-transitory computer readable storage mediums for identifying the software partition in a set of requesting partitions that the request originated from;

computer usable program code stored on at least one of the one or more non-transitory computer readable storage mediums for determining whether the software partition the request originated from is authorized to view the protected file based on a policy specified in a file status for the protected file; and computer usable program code stored on at least one of the one or more non-transitory computer readable storage mediums for generating, responsive to determining that the software partition is authorized to view the protected file, different views of information in the protected file for one or more requesting partitions in the set of requesting partitions based on the policy.

12. The computer program product of claim 11, wherein the computer usable program code for calling the callback function using the set of file viewing parameters to form the set of virtual viewing parameters comprises:

computer usable program code for replacing the set of file viewing parameters included in the request for the protected file with the set of virtual viewing parameters.

13. The computer program product of claim 8, wherein the callback function utilizes an offset map to form the set of virtual viewing parameters.

14. The computer program product of claim 8, wherein the request is a system call.

15. An apparatus for creating secured file views of a protected file, the apparatus comprising:

one or more processors, one or more non-transitory computer readable storage medium, and one or more computer readable memories for an operating system;

program instructions stored in at least one non-transitory computer readable storage medium for execution by at least one processor via at least one computer readable memory for receiving a request to access the protected file from a user of a software partition, wherein the protected file is stored in a common storage device for a file system, wherein the request includes a set of file viewing parameters that reference restricted portions and unrestricted portions of the protected file;

program instructions stored in at least one non-transitory computer readable storage medium for execution by at least one processor via at least one computer readable memory for identifying a set of file offset values in the set of file viewing parameters, wherein the set of file offset values correspond to actual locations within the protected file;

program instructions stored in at least one non-transitory computer readable storage medium for execution by at least one processor via at least one computer readable memory for calling a callback function associated with the protected file to map one or more file offset values in the set of file offset values to a virtual offset value in a set of virtual offset values to form a set of virtual viewing parameters, wherein the set of virtual offset values correspond to only unrestricted locations within the protected file referencing only the unrestricted portions of the protected file; and program instructions stored in at least one non-transitory computer readable storage medium for execution by at least one processor via at least one computer readable memory for generating a secured file view of the protected file using the virtual viewing parameters by returning data from only locations within the protected file that correspond with a virtual offset value in the set of virtual offset values in the virtual viewing parameters, wherein the secured file view is viewable by the user of the software partition and wherein the secured file view does not include a view of data in the restricted portions of the protected file originally requested in set of file viewing parameters in the request.

16. The apparatus of claim 15, further comprising:

program instructions stored in at least one non-transitory computer readable storage medium for execution by at least one processor via at least one computer readable memory for replacing the set of file viewing parameters included in the request for the protected file with the set of virtual viewing parameters;

wherein the set of file viewing parameters are a set of file offset values, wherein the set of virtual viewing parameters are a set of virtual offset values.

17. The apparatus of claim 15, wherein the operating system further comprises:

an inode usable by an operating system kernel for identifying the callback function.

18. The apparatus of claim 17, wherein the inode further comprises:
- a first field designating a protected status of the protected file; and
- a second field identifying the callback function.

19. A computer implemented method for forming a set of file viewing parameters from a set of virtual viewing parameters, the computer implemented method comprising:
- a computer receiving a call from a requesting partition in a plurality of requesting partitions to access a protected file stored in a common storage device for a file system for the set of requesting partitions, wherein the call includes a set of file viewing parameters that reference restricted portions and unrestricted portions of the protected file;
- the computer identifying a set of file offset values in the set of file viewing parameters, wherein the set of file offset values correspond to actual locations within the protected file;
- the computer determining from account information of a user of the requesting partition whether the requesting partition is authorized to receive data from the restricted portions of the protected file, wherein each partition in the plurality of requesting partitions has differing levels of authorization to view information in the protected file;
- the computer mapping, responsive to determining that the user is not authorized to view the restricted portions of the protected file, one or more file offset values in the set of file offset values to a virtual offset value in a set of virtual offset values in an offset map to form a set of virtual viewing parameters, wherein the set of virtual offset values correspond to only unrestricted locations within the protected file referencing only the unrestricted portions of the protected file; and
- the computer generating a filtered view of the protected file using the virtual viewing parameters by returning data from only locations within in the protected file that correspond with a virtual offset value in the set of virtual offset values in the virtual viewing parameters, wherein the filtered view is viewable by the user of the requesting partition, wherein the secured file view does not include a view of data in the restricted portions of the protected file originally requested in set of file viewing parameters in the request, and wherein different views of information in the protected file are generated for one or more requesting partitions in the plurality of requesting partitions.

20. The computer implemented method of claim 19, wherein mapping the one or more file offset values in the set of file offset values to the virtual offset value in the set of virtual offset values in the offset map to form the set of virtual viewing parameters comprises:
- the computer replacing the set of file viewing parameters included in the call to access the protected file with the set of virtual viewing parameters.

* * * * *